United States Patent Office 3,210,352
Patented Oct. 5, 1965

3,210,352
PREPARATION OF MELAMINE
Johannes J. Steggerda, Geleen, Netherlands, assignor to Stamicarbon N.V., Heerlen, Netherlands
No Drawing. Filed Mar. 20, 1961, Ser. No. 96,717
Claims priority, application Netherlands, Mar. 23, 1960, 249,750
4 Claims. (Cl. 260—249.7)

The present invention relates to an improved process for the production of melamine by heating urea and/or any of the products obtained by the thermal decomposition of urea, such as biuret.

It is known that melamine can be prepared by heating urea in the presence of a catalyst and under pressure, the partial pressure of $NH_3$ and $CO_2$ during this process being at least 70 atm. and the temperature at least 300–450° C. The catalyst may be phosphoric acid, phosphorus pentoxide or salts of phosphoric acid used in an amount comprising from 0.1 to 10 mol percent calculated on the amount of starting material (U.S. Patent 2,550,659).

It is also known that melamine can be prepared by heating urea in the presence of $NH_3$ and $SO_2$ at 200° to 360° C. and an $NH_3$-pressure of 14–70 atm., in the presence of from 0.01 to 10% by weight, based on the amount of starting material, of a catalyst consisting of an oxide, salt or acid of at least one element from the group consisting of phosphorus, arsenic and antimony (Canadian Patent 561,302).

Furthermore, it is known that the catalytic use of boron and boron compounds, such as boric acid, boric oxide, boron fluoride, metaborates and boron phosphate, favorably affects the preparation of melamine from urea, $NH_3$ and $SO_2$ (U.S. Patent 2,857,381).

One common drawback to the abovementioned procedures is the requirement that the reaction must always be carried out under a relatively high pressure and, as a result, high demands are placed upon the apparatus which is utilized. Accordingly, the principal object of the present invention is to provide an improved method for preparing melamine from urea and/or the thermal decomposition products thereof, whereby the use of a high reaction pressure is made unnecessary. Another object of the invention is the provision of a method of preparing melamine as aforesaid whereby the use of specially designed pressure apparatus is obviated and the reaction may be carried out in a straightforward manner at normal pressure. By "normal pressure" is to be understood here and in the claims a pressure of 1 atmosphere augmented by the pressure needed for overcoming the resistance meeted by the gas stream in passing through the synthesis plant. Normally the total pressure required will not exceed 2 atm. Other objects will also be hereinafter apparent.

It has now been found that melamine can be produced at normal pressure, by heating a member of the group consisting of urea and the thermal decomposition products thereof such as biuret, at a temperature of at least 220° C. in the presence of $NH_3$ and in contact with a catalyst consisting essentially of at least one member of the group consisting of boron phosphate and aluminum phosphate.

The preparation of melamine at normal pressure by heating urea in the presence of $NH_3$ and a solid, porous material with a large internal surface area of 180–650 m.$^2$/g., such as silica gel has previously been described (British Patent 767,344). However, in contrast to this prior proposal, the catalysts of the present invention, i.e., the boron phosphate and aluminum phosphate, do not possess a large internal surface area. Thus, for example, boron phosphate having an internal surface area of 16 m.$^2$/g. and aluminum phosphate having an internal surface area of 54 m.$^2$/g. have been successfully used according to the present invention. It will, however, be appreciated that the actual internal surface area of the boron phosphate or aluminum phosphate can be varied, the most important factor being that there is no necessity for using materials with large internal surface areas as required in British Patent 767,344. Thus, the internal surface area of the phosphate used herein need not exceed 50 m.$^2$/g. to give effective results. Melamine yields amounting to 90% of theoretical can be obtained by this process.

In carrying out the present method, the amount of boron phosphate and/or aluminum phosphate utilized may be varied. However, the total amount of catalyst, necessary to produce 1 kg. melamine per hour, will usually fall within the range of 5 to 50 kg.

As indicated above, the operating temperature must be at least 220° C. but, apart from this limitation, the temperature may be varied substantially. However, a desirable range is between 300 to 400° C.

The production of melamine can best be carried out according to the present invention by supplying the starting material, e.g. urea, to a catalyst bed which is fluidized with a stream of $NH_3$, while the gases formed in the bed are conducted through a fixed catalyst bed. As a typical illustration, the ratio $NH_3$/urea may in this case be 1.5–5 m.$^3$ $NH_3$ per kg. of urea and the amount by weight of the catalyst in the fixed bed may be ten to twenty times the amount of the fluid bed.

The invention is illustrated, but not limited, by the following examples.

Example I 100 g. of urea per hour were fed into a fluidized bed of particulate boron phosphate, having an internal surface area of about 16 m.$^2$/g., the bed being fluidized by means of gaseous $NH_3$. Approximately 2.5 m.$^3$ of $NH_3$ were used per kg. of urea. The temperature of the bed was 350° C. The mixture of gases leaving the top of the fluidized bed was then fed into the bottom of a fixed bed of boron phosphate at 330° C. 30 g. of melamine were recovered per hour, corresponding to a yield of 90%.

Example II

The process of Example I was repeated except that the boron phosphate was replaced by aluminum phosphate having an internal surface area of 54 m.$^2$/g. to give essentially the same yield of melamine.

Example III

The process of Example I was repeated using biuret in lieu of urea. The yield was about 90% of theoretical.

It will be recognized that various modifications may be made in the invention described herein without deviating from the scope thereof as set forth in the following claims.

I claim:
1. A method of preparing melamine which comprises heating a member of the group consisting of urea and thermal decomposition products thereof at normal pressure and a temperature of at least 220° C. in the presence of NH₃ and a catalyst consisting essentially of a solid phosphate selected from the group consisting of boron phosphate and aluminum phosphate.

2. The process of claim 1 wherein said member is heated between 300 and 400° C.

3. The process of claim 1 wherein urea is heated first in the presence of a fluidized catalyst bed and then in the presence of a fixed catalyst bed.

4. A process of preparing melamine which comprises heating a member of the group consisting of urea and its autogenous decomposition products in the presence of NH₃ and boron phosphate at atmospheric pressure and at a temperature ranging from above the volatization temperature of urea and to about 400° C.

References Cited by the Examiner

UNITED STATES PATENTS

| 2,550,659 | 4/51 | Vingee | 260—249.7 |
| 2,857,381 | 10/58 | Jackson et al. | 260—249.7 |
| 2,902,488 | 9/59 | Jackson et al. | 260—249.7 |

FOREIGN PATENTS

| 560,215 | 7/58 | Canada. |
| 767,344 | 9/54 | Great Britain. |

WALTER A. MODANCE, *Primary Examiner.*

DUVAL T. McCUTCHEN, JOHN D. RANDOLPH,
*Examiners.*